C. O. WEDERKINCH.
Alignment Instruments.
No. 147,210.        Patented Feb. 3, 1874.
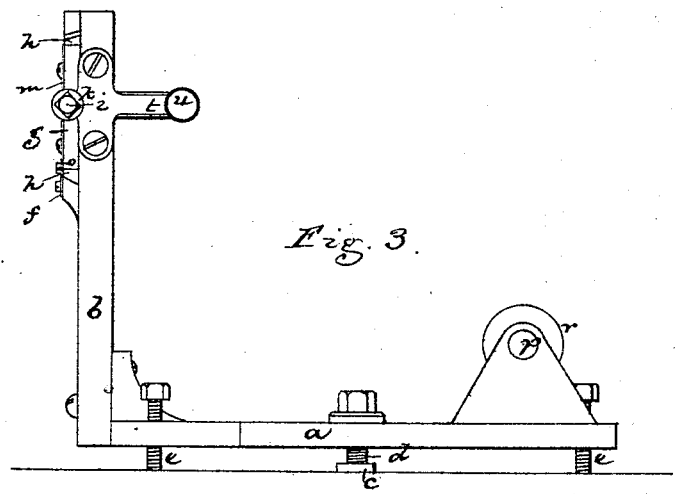
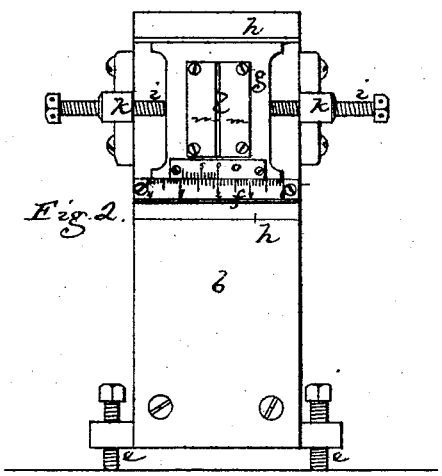
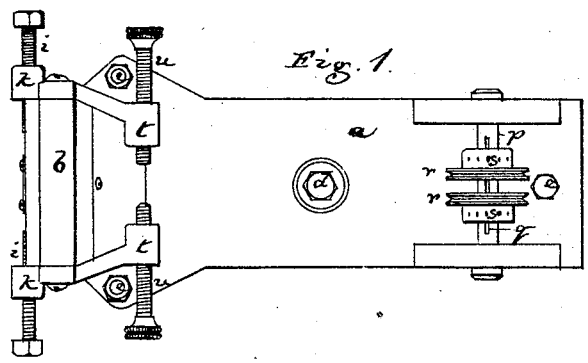

UNITED STATES PATENT OFFICE.

CARL O. WEDERKINCH, OF NORTH ADAMS, MASSACHUSETTS.

IMPROVEMENT IN ALIGNMENT-INSTRUMENTS.

Specification forming part of Letters Patent No. 147,210, dated February 3, 1874; application filed October 9, 1873.

*To all whom it may concern:*

Be it known that I, CARL O. WEDERKINCH, of North Adams, in the county of Berkshire and State of Massachusetts, have invented an Improved Alignment-Instrument; and I do hereby declare that the following, taken in connection with the drawings which accompany and form part of this specification, is a description of my invention sufficient to enable those skilled in the art to practice it.

My invention relates to the construction of an instrument to be used by engineers in running lines, and for correction of unavoidable errors, caused particularly by changes in condition of the atmosphere at different times.

The exigency for such an instrument was developed in my practice as a civil engineer at Hoosac Mountain, in running lines for the shafts of the tunnels, my work demonstrating that in projecting a line between two points, from points beyond, the projections, if made at different times, would not agree. Hence, I found it necessary to project lines at different times, to note the variations, and finally correct the work of alignment by averaging the varying results, and in working in such manner I obtained final results of almost absolute correctness. For such method of operating, I devised the instrument forming the subject of this invention.

Such instrument consists of a plate upon an upright, extending from one end of which is a stationary scale, and over this scale a horizontally-moving slide, held between the ends of set-screws, and adjusted by said screws, said slide entering a vertical slit, and having a vernier-scale, reading against the stationary scale. The main plate or frame is made with provision for fastening it in position at the spot where the instrument is to be used, and also with provision for adjusting it as to perpendicularity, the instrument, after being fixed in position, being adjusted and remaining in position until all alignments to be made through such spot are finished. In the aligning operations, the transit-instrument is set upon the line of projection, and the line to be extended from and through the two points is projected upon the scale, and the vernier-plate is moved until the slit meets the axis of the telescope; the vernier is then read against the scale, and the distance is recorded. At another time, the line is similarly projected, the vernier-plate moved, and the distance on the scale recorded, and so until these distances being finally averaged and the mean computed, the alignment is made by this mean distance.

My invention consists, primarily, in the instrument thus generally described, and in the combination therewith of devices by which fine metal wires are stretched between two such instruments, placed, respectively, upon opposite sides of a shaft, such wires extending through the slit in the slide-plate, and being set against the opposite sides of said slit by adjusting-screws, and tautened and held by windlass-wheels turning on a slotted shaft at the rear end of the instrument, such wheels moving and turning loosely upon said shaft, and being held, each, by a pin extending through some one of a series of radial holes made through the hub, and into the shaft-slot.

The drawing represents an instrument embodying the invention.

Figure 1 shows the instrument in plan. Fig. 2 is a front elevation of it. Fig. 3 is a side elevation.

$a$ denotes the main plate, having at one end the upright or vertical arm $b$. The plate $a$ is fastened to a suitable plug, $c$, by a screw-bolt, $d$, and is leveled by set-screws $e$. Fixed upon the front face of the upright $b$ is the stationary scale $f$, and over this scale is placed a slide, $g$, moving between horizontal guides or ways $h$, and held between adjusting and set screws $i$, which turn in nut-threaded bearings $k$. In the center of this slide is a vertical slit, $l$, preferably formed by or between two plates, $m$, under which is a vernier-scale, $o$, the divisions of which move over the divisions of the main scale $f$. The instrument being set on the apparent line between the points established at each side of a shaft, at the foot of which the tunnel is to run, and the plate being adjusted, the vernier-plate is sighted to, through the transit-telescope, and is moved by the screws, until the slit $l$ is in the axial line of the transit-instrument, and the position of the slit upon the main scale is then read by the vernier. The instrument remaining stationary, and this operation being repeated at suitable intervals of time, the results are averaged and the slide is moved until, by the vernier and scale, the center of the slit $l$ reaches the main point, which will be the true alignment or projection of the line. An instrument being similarly placed at the opposite side of the shaft, and its slit brought into the alignment, the line is transferred to the bottom of the shaft by the following means: At the rear end of the plate $a$ is a stationary or horizontal pin or shaft, $p$, in which is a longitudinal slot, $q$. Upon this shaft are the two wheels $r$, loose upon the shaft. Each wheel has a peripheral groove for receiving a fine metal wire, and in the hub of each wheel are radial holes $s$. On the back side of the vertical arm $b$ are screw-threaded bearings $t$, in which work horizontal set-screws $u$. Two fine metal wires being extended over the top of the shaft, from one instrument to the other, their opposite ends are passed through the slits $l$, and wound around the wheels $r$, and the wheels of each pair are turned until the wires are properly strained, and the wheels are then fastened in position by pins extending through the holes in line with the slot $q$, and into the slot, the wheels being moved to bring the wires into general line with the slits. Then each screw $u$ is turned until its end holds the adjacent strained wire just at the adjacent edge of the slit. This being done, there will be two wires extending over the top of the shaft, and the center line between these wires (the wires being very near together and parallel) will be the line to be transferred. By plumbing from between or one side of these wires, at different places, to the bottom of the shaft, the line is established, or is transferred from the surface of the ground to the bottom of the shaft. For this operation, one horizontal wire may be used, but I prefer the two; also, a vertical pin may be used in place of the vertical slit in the vernier-plate.

I claim—

1. The leveling-plate $a$, from which extends the vertical arm that has the stationary scale $f$ and the slide $g$, said slide being movable and adjustable, and having the center slit $l$ and vernier-scale $o$, all substantially as shown and described.

2. The wire setting and confining devices, consisting of the shaft $p$, wheel or wheels $r$, and set-screw $u$, arranged and operating substantially as described.

3. An alignment-instrument, consisting of a movable vertical line or slit, provided with a graduated scale, in combination with the wire setting and confining devices hereinbefore described, or their equivalents.

CARL O. WEDERKINCH.

Witnesses:
WM. H. DUMVILLE,
AUSTIN BOND.